Dec. 27, 1927.  1,653,676
C. G. STRANDLUND ET AL
DRAFT DEVICE
Original Filed April 5, 1920   3 Sheets-Sheet 2
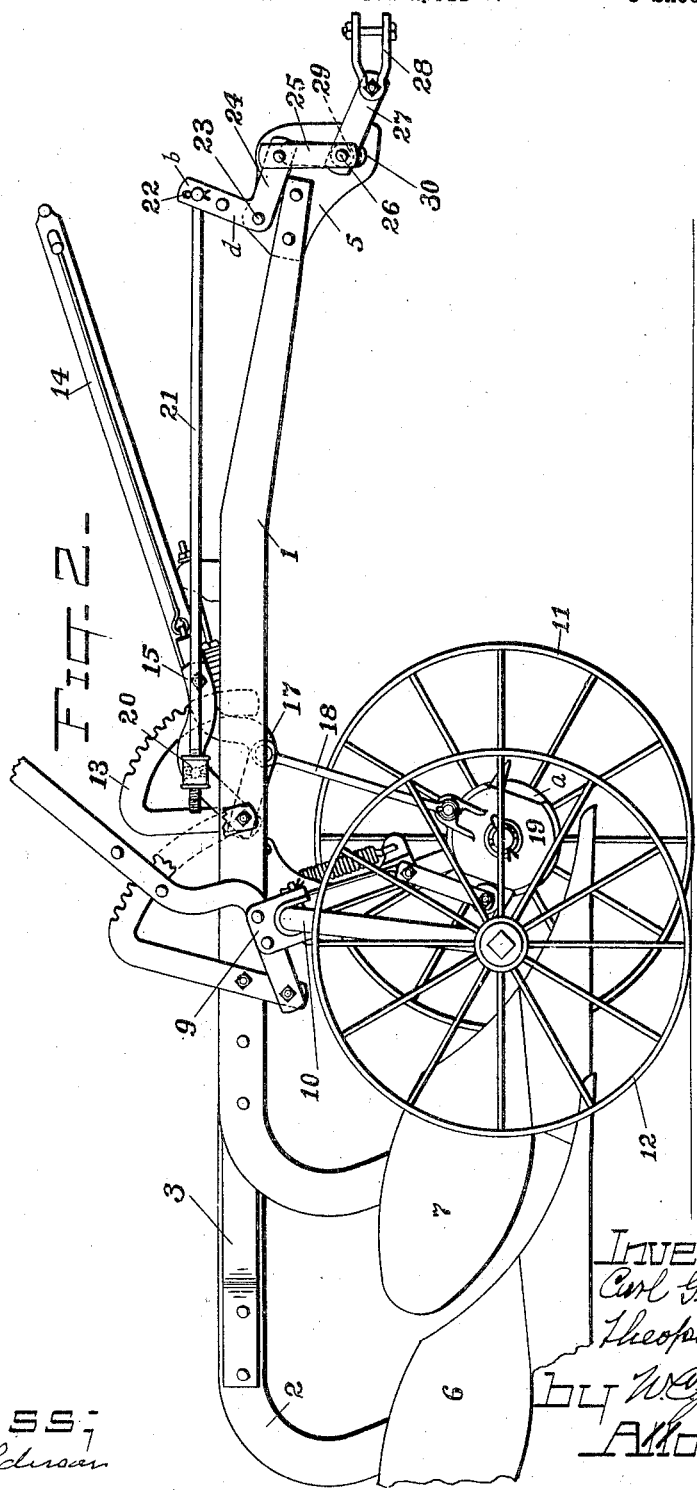

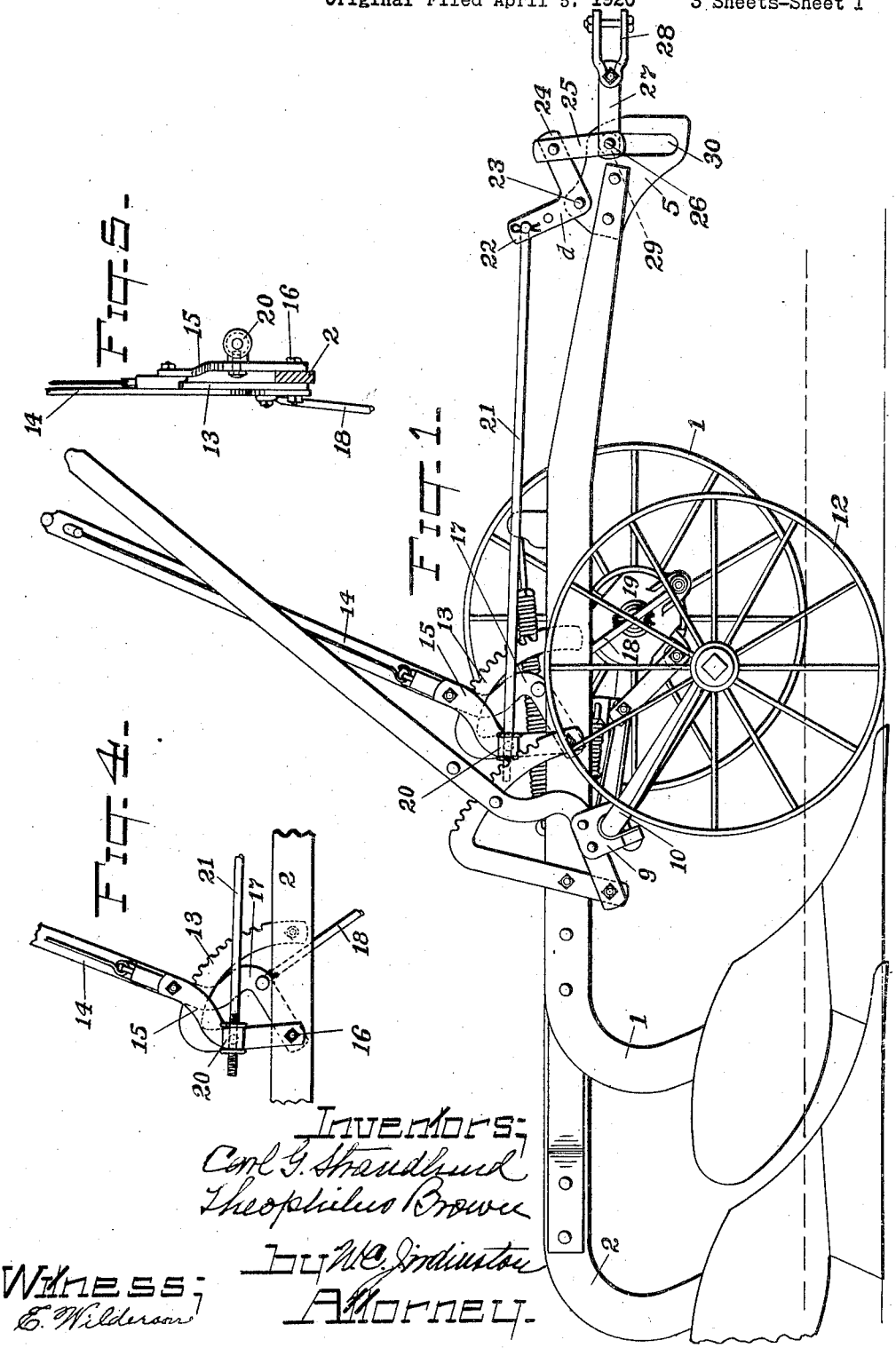

Dec. 27, 1927.　1,653,676
C. G. STRANDLUND ET AL
DRAFT DEVICE
Original Filed April 5, 1920　3 Sheets-Sheet 3
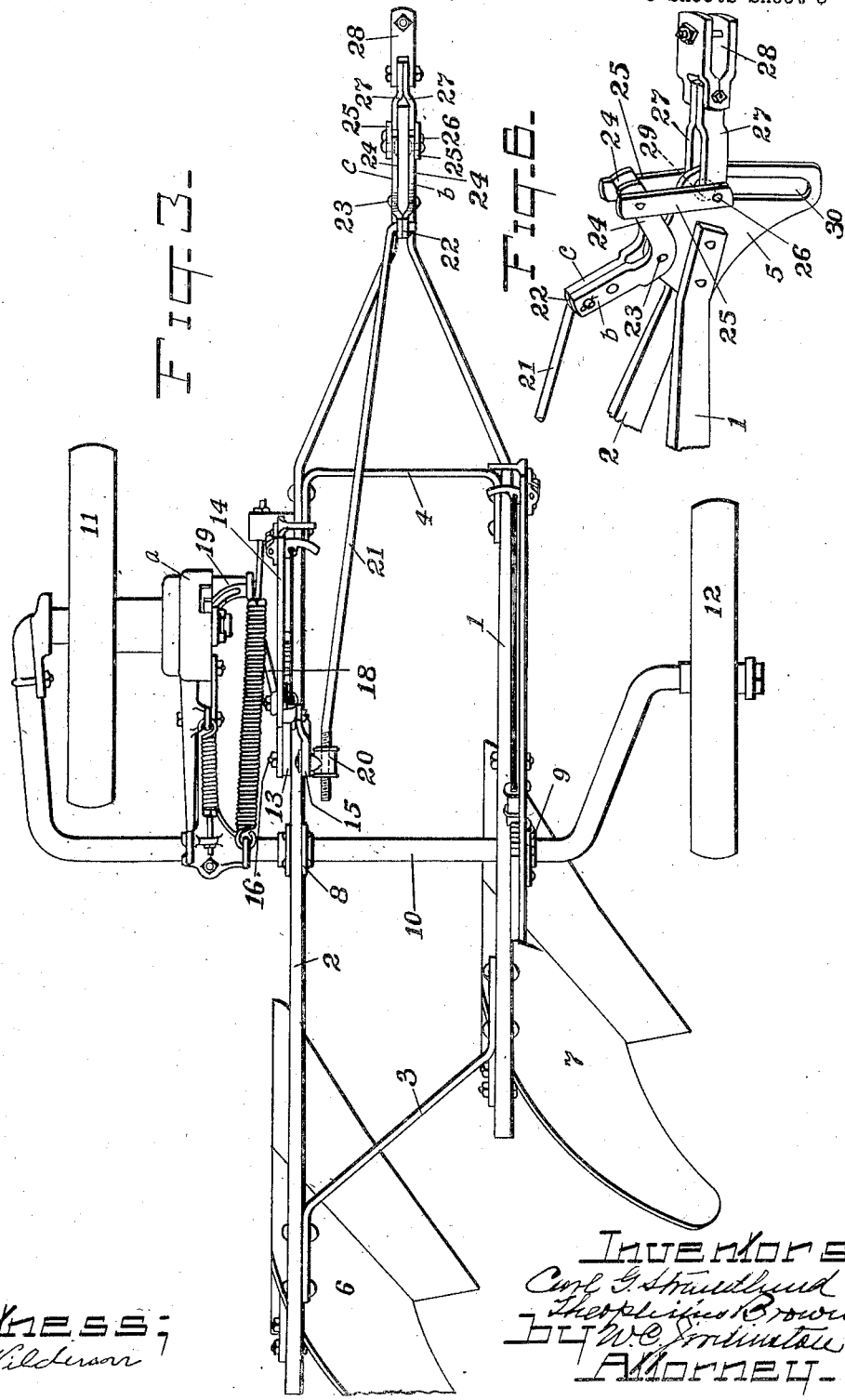

Patented Dec. 27, 1927.

1,653,676

UNITED STATES PATENT OFFICE.

CARL G. STRANDLUND AND THEOPHILUS BROWN, OF MOLINE, ILLINOIS, ASSIGNORS TO DEERE & COMPANY, OF MOLINE, ILLINOIS, A CORPORATION OF ILLINOIS.

DRAFT DEVICE.

Application filed April 5, 1920, Serial No. 371,245. Renewed February 12, 1925.

Our invention relates to wheeled plows having means for raising or lowering the plow, and adjusting it to varying depths of operation, and has for its object to provide means for simultaneously moving the front end of the plow in a vertical direction when the plow is adjusted to vary the depth of plowing.

Referring to the drawings in which similar numerals indicate identical parts—

Figure 1 is a furrowward side elevation of a wheeled plow embodying our invention, showing the plow as in operation at its greatest depth.

Figure 2 is a furrowward side elevation showing the plow raised and out of operation with the depth adjusting lever set for shallow plowing.

Figure 3 is a plan view of Figure 1.

Figure 4 is a detail in elevation of the operating lever viewed from the furrowward side.

Figure 5 is a rear view in detail of the operating lever and connected parts, and Figure 6 is a perspective view of the forward end of the plow and draft connections with the parts in the position as shown in Figure 1.

The plow beams 1 and 2 are spaced apart by braces 3 and 4 and have their forward ends converging to a clevis 5 to which they are securely bolted. The rear ends of the beams 1 and 2 extend downwardly and carry plow bodies 6 and 7. Suitably journaled to rock in bearings 8 and 9 on the beams 1 and 2 respectively, is an axle 10 having crank terminations on which are mounted ground wheels 11 and 12. A notched segment 13 is secured on the beam 2, and a depth controlling lever 14 is pivotally mounted on the landward side of the beam 2 and is provided with a common type of latch to cooperate with the notches in the segment 13 to hold the lever in any one of its various positions of adjustment. Rigidly secured on the furrowward side of the lever 14 is an arm 15 which is pivoted on the beam 2 by the bolt 16 which is also the pivot of the lever 14.

The lever 14 is bent above its pivot to form an elbow 17 to which is pivotally connected a link 18 which extends to pivotal connection with a member 19, forming part of a power lift mechanism well known in the art, and including a clutch, one part of which $a$ is mounted on a crank arm of the axle 10 so as to rotate with the land wheel 11, and a second part, the member 19, which is loosely mounted on the crank arm and is engageable with the part $a$ to rotate therewith when it is desired to raise the plow out of operation, but is normally out of engagement with the part $a$ and held against rotation, by a well known type of trip mechanism.

The arm 15 is bent rearwardly intermediate its pivot and point of attachment to the lever 14, and pivotally mounted at the bend is a sleeve 20 within which is secured the rear end of a rod 21 having its forward end bent to hook in a suitable opening in an upstanding arm 22 of a bell-crank or three armed lever $d$. The bell-crank $d$ is preferably composed of two bars each bent at approximately a right angle and having end portions $b$ and $c$, that are secured together to form the arm 22; the opposite end portions of said bars being spaced apart by offsetting the bars intermediately in opposite directions to form parallel arms 24, as shown in Fig. 6. The bell-crank as a whole is rockably supported at opposite sides of the clevis 5, which it straddles, by a pivot bolt 23. The arms 24 extend forwardly, on opposite sides of the clevis 5, and to each is pivotally attached a depending link 25.

Draft power is transmitted to the plow from an external propelling agency, such as a tractor, by means of a power transmitter in the form of a draft connection, which, in the present instance, comprises draft links 27 and a clevis 28. The clevis 28 is adapted to be attached to a doubletree, or to a tractor, to swing laterally about its attaching bolt, and the draft links 27 connect the clevis 28 with the plow clevis 5 for transmitting the draft to the plow. To this end the draft links 27 are pivotally connected at their forward ends with the clevis 28 by a transverse pivot, and their rear ends diverge to receive the clevis 5 between them. A bolt 26 passes through the rear ends of the links 27 and through a vertical slot 30 in the clevis 5, a roller 29 being preferably mounted on said bolt to travel in said slot. Thus the front end of the plow is capable of vertical movement with respect to the draft connection 27, 28. The rear ends of the links 27 are connected with the lower ends of the links 25 by the bolt 26, for controlling the position of the draft connection with respect to the front end of the plow when the plow is adjusted vertically, as hereinafter described. It should be understood that it is not essential that the draft connection be constructed precisely as above described, as any equivalent means for the purpose may be employed.

Referring to the drawings, in Figure 1 the plow is shown in operation at its greatest depth and the lever 14 rocked rearwardly to the limit of its rearward movement, and the bell-crank d operated to raise the links 25 carrying the roller 29 upwardly in the slot 30 in the clevis 5, and at the same time raising the draft links 27 which are connected to the coupling 28. When the depth of plowing is to be altered the lever 14 is rocked forwardly, swinging upon the rod 18 as a fulcrum, and as its lower end is pivotally connected with the beam 2, such forward movement of the lever will raise the plow. When it has been raised to the required extent, it may be locked for operation at the new level by the engagement of the latch on the lever 14 with one of the notches in the segment 13. Simultaneously with the upward movement of the plow effected by operating the lever 14, the arms 24 of the bell-crank d through the rod 21 which connects said bell-crank with the lever 14, are moved downwardly to compensate for the upward movement of the plow effected by the actuation of said lever, and consequently the roller 29 because of its being supported from the arms 24 on the links 25, maintains its position substantially in the line of draft, notwithstanding the change in position vertically of the front end of the beam and of the point of application of the draft thereto through the roller 29. Notwithstanding adjustment of the depth of plowing, therefore, the bottoms of the plow bodies maintain their level position when operating at any depth within their range. If the plow is operating at a shallow depth and it is desired to plow deeper the operation of the parts will be the reverse of that just described.

The art discloses many devices for adjusting the forward end of a wheeled plow to conform with adjustment of the plow for depth in operation, and many such devices have been employed, but in all instances they are adjusted independently of the operation of regulating the plow for depth, such devices including adjustable clevises and adjustable supporting wheels, all of them necessitating a separate operation for their adjustment. Our device is simultaneously adjustable relative to the plow by operation of the means employed to regulate the depth of plowing, and is applicable to any type of wheeled plow, either horse or tractor drawn and lifted either by hand or traction power, and controlled by suitable lever mechanism convenient to the operator, so that the line of draft is maintained substantially constant irrespective of the vertical movement of the plow. The line of draft referred to is the line which extends from the median point of the resistances met by the plow bodies (when they are plowing and bearing against the earth) forward and upward to the point at which the power is transmitted from the external propelling agency. The design of the plowing structure (including the earth-contacting parts of the body, the carrying beams, and the adjunct parts by which they are supported and adjusted) should be such that when the bodies are shifted from a position for one depth of plowing to a position for another depth the line of draft will remain approximately constant, vertically, in relation to the aforesaid point at which the power is transmitted from the external agency. If the part of said line near that point is shifted, for example, elevated or lowered, when the plow structure is adjusted from one working depth to another, the pull upon the points of the plow bodies will tend to cause them to move up or down into improper positions. The lever at 14 and the link at 18 can be utilized by the operator at any time to lift or lower the plow structure, and this shifts, vertically, the positions of the bodies from one line of plowing to another line, and varies the depth of plowing. To do this properly the front part of the beam frame should be allowed to move bodily up or down, during such shifting, vertically, of the positions of the bodies, and such movement of the front end part of the beam frame should be accomplished without affecting the position of the forward upper part of the line of draft. That is to say, the front end of the plow structure, in order to ensure the proper shifting of the bodies for depth adjustment, should be capable of moving up or down while the bodies are being so shifted, but such movement of the front part of the beam should be accomplished without interrupting the transmission of the propelling force to the beam at the active point of the external draft device (as that at 28) and without vertically varying or deflecting the line of draft.

Heretofore plow structures of the present class have each included means for elevating or lowering the plow bodies relatively to the wheels. In all cases in our knowledge the front end of the beam structure has either been held fixed, vertically, at an axis around which the bodies swing vertically, or that end of the beam structure has been so connected to the external draft device in front of it that the latter was carried, vertically, with the beam end at the times when the bodies were being adjusted for variations in depth, and this vertical movement of the connecting device in front of the beam dislocates the true "line of draft". But such dislocating of this line is obviated by employing a device equivalent to the plate 5 having the elongated slot 30 in which is positioned the element (as pin 26 or roller 29) which transmits the propelling force from the external agency. Such parts as the pin or roller and the plate with the slot allow the plow structure (including not only the bodies but the rear and front end parts of the beam element) to move bodily, vertically, through the range of the several predetermined plowing depths without breaking the power transmitting connection while the beam is moving vertically, and without varying the position of the point of power application; that is, without dislocating the line of draft.

By joining the last element (such as the pin or roller at 26—29) of the draft transmitting train to the depth adjusting mechanism by connections which are mounted on the plow structure, as for example, the link 21, the bell-crank $d$ and the link 25, the two principal adjustments referred to, can be accomplished simultaneously as has been described.

When the plow is of the sub-class here typified the plow structure, proper, and the supporting wheels are separated or brought together simultaneously with the making of these adjustments, this mechanism differing in this respect from those which have necessitated a separate adjustment of the beam or frame elements in relation to the wheels before or after adjustment has been made of the draft devices at the front ends of the beam. Moreover, the present plow structure, itself, while being shifted from one working position to another normally moves approximately in horizontal parallelism, the mechanism in this respect differing materially from those wherein the plow bodies move in the arcs of circles while having their depth adjustment varied.

The link 27 is employed to obviate the results of jerks or shocks caused by sudden changes in the vertical position of the external draft device, in the present instance the coupling 28, and said link is made as short as practicable so that the front end of the beam will be held against rising high enough to interfere with the proper lifting of the rear portion of the plow when the plow is raised out of operative position, as by the actuation of the automatic lifting devices. When the plow is raised out of operative position the plow structure and the draft connections, including the link 27, swing vertically around the pivotal connection between said link and the coupling 28 as a substantially fixed axial line.

The implement also has means for "leveling" for when the furrow wheel 12 is in the furrow the adjacent part of the frame tends to incline downward. By the lever on that side the adjacent parts can be elevated until the frame is level throughout and the plow bodies will then be held in proper position. The line along which the furrow wheel rolls varies, vertically, with the depth of plowing. These variations affect only to a slight degree the "line of draft" that has been referred to; and the distance, vertically, from the lower part or tread of the furrow wheel to the draft connections can also be regarded as approximately fixed.

What we claim is—

1. In a plow of the class described, the combination with the wheels and the vertically adjustable plow structure, of means to adjust the plow vertically relatively to the wheels for varying the depth of plowing, a draft connection for the plow structure adapted to be connected with an external propelling agency, and to be connected with the plow in predetermined position with respect to the ground, and devices actuated by said depth adjusting means to maintain said draft connection in said position notwithstanding vertical adjustment of the plow.

2. In a plow of the class described, the combination with the wheels and the vertically adjustable plow structure, of means to adjust the plow vertically relatively to the wheels for varying the depth of plowing, a draft connection for the plow structure adapted to be connected with an external propelling agency, and to be connected with the plow in predetermined position with respect to the ground, and devices actuated by said depth adjusting means simultaneously with their movement of adjustment, to maintain the draft connection in said position notwithstanding vertical adjustment of the plow.

3. In a plow of the class described, the combination of supporting wheels, a plow structure comprising a body and a beam supported for vertical adjustment, a draft connection adapted to be connected with an external propelling agency, and connected with the front end of the beam in a line of draft which is at a predetermined distance from the ground, said draft connection being vertically movable relatively to the beam, and means for optionally varying the position, vertically, of the plow body relatively to the wheels and coincidently adjusting the beam element vertically relatively to said draft connection.

4. In a plow of the class described, the combination of supporting wheels, a plow structure comprising a body and a beam supported for vertical adjustment, depth adjusting means for optionally lifting and lowering the plow structure on said wheels, a draft connection adapted to be connected with an external propelling agency and connected with the front end of the beam in a line of draft which is at a predetermined distance from the ground, said draft connection being vertically movable relatively to the beam, and devices actuated by said depth adjusting means for holding said draft connection substantially in said line of draft irrespective of the working position of the plow body.

5. In a plow of the class described, the combination of supporting wheels, a plow structure comprising a body and a beam supported for vertical adjustment substantially in horizontal parallelism, a draft connection adapted to be connected with an external propelling agency and connected with the front end of the beam in a line of draft which is at a predetermined distance from the ground, said draft connection being vertically movable relatively to the beam, depth adjusting means for optionally lifting and lowering the plow structure on said wheels, and devices mounted on the plow structure and actuated by said depth adjusting means for holding said draft connection substantially in said line of draft independently of vertical movement of the front end of the plow structure.

6. In a plow of the class described, the combination of supporting wheels, a plow structure supported thereby for vertical adjustment and comprising a body and a beam, a draft connection vertically movable relatively to the beam, means to adjust the plow structure vertically to vary the depth of plowing, power operated means for vertically lifting the plow structure independently of actuation of the aforesaid depth adjusting means, and devices connecting said draft connection with said depth adjusting means and operating to hold said draft connection in predetermined position independently of the vertical movement of the plow structure effected by actuation of said depth adjusting means.

7. In a plow of the class described, the combination of supporting wheels, a vertically adjustable plow structure comprising a body and a beam, a draft connection adapted to be connected to an external propelling agency and relatively movable vertically with respect to the beam, means for holding said draft connection approximately fixed, vertically, relatively to the ground when the plow is in operative position, means for vertically adjusting the plow structure to vary the depth of plowing and relatively to said draft connection, and power operated lifting mechanism operable to swing the plow structure and the draft connection vertically around a substantially fixed axial line.

8. In a wheeled plow, the combination of a lever operable to raise or lower the plow to vary the depth of plowing, draft devices including a member having a vertical slot, a bell-crank pivotally mounted on said member, links depending from an arm of the bell crank and having a roller supported between their lower ends and within said slot, a draft coupling, a draft link connection between said roller and coupling, and a rod operatively connecting the bell crank and lever.

9. In a wheeled plow having an adjustable furrow wheel for raising and lowering the plow, a draft connection therefor, and means to simultaneously shift the draft connection sufficiently when said wheel is adjusted to maintain substantially the same vertical distance between the tread of the wheel and the draft connection.

10. In a plow, the combination with a beam, a furrow opener carried thereby, a ground engaging wheel, means supporting the beam on said wheel for vertical adjustment, and means operable to adjust said supporting means to vary the depth of plowing, of a laterally swinging draft connection relatively movable vertically with respect to the beam, for transmitting the draft of a propelling member to the plow, and means connected with and actuated by operation of said depth adjusting means to maintain said draft connection substantially in the line of draft notwithstanding vertical adjustment of the plow to change the depth of plowing.

11. In a plow, the combination with a beam, a furrow opener carried thereby, a ground engaging wheel, means supporting the beam on said wheel for vertical adjustment, and means operable to adjust said supporting means to vary the depth of plowing, of a vertically and laterally swinging draft connection for transmitting the draft of a propelling member to the plow, said connection and beam being capable of vertical movement relatively to each other, and means connected with and actuated by operation of said depth adjusting means to maintain said draft connection substantially in the line of draft notwithstanding vertical adjustment of the plow to change the depth of plowing.

12. In a plow, the combination with a beam, a furrow opener carried thereby, a ground engaging wheel, means supporting the beam on said wheel for vertical adjustment, and means operable to adjust said supporting means to vary the depth of plowing, of a vertically and laterally swinging draft connection for transmitting the draft of a propelling member to the plow, said connection and the beam being capable of vertical movement relatively to each other, and means connected with and actuated by operation of said depth adjusting means to move the beam vertically relatively to said draft connection in accordance with vertical adjustment of the plow to change the depth of plowing.

13. In a plow, the combination with a beam, a furrow opener carried thereby, a ground engaging wheel, means supporting the beam on said wheel for vertical adjustment, and a lever operable to adjust said supporting means to vary the depth of plowing, of a vertically and laterally swinging draft connection for transmitting the draft of a propelling member to the beam, said connection and the beam being capable of vertical movement relatively to each other, and a bell crank lever connected with and actuated by operation of said depth adjusting lever to move the beam vertically relatively to said draft connection in accordance with vertical adjustment of the beam to change the depth of plowing.

14. In a plow, the combination with a beam, a furrow opener carried thereby, a ground engaging wheel, means supporting the beam on said wheel for vertical adjustment, and means operable to adjust said supporting means to vary the depth of plowing, of a three-armed lever adapted to swing in a vertical plane and having one of its arms pivotally connected with the front end portion of the beam, a draft connection relatively movable vertically with respect to the beam and adapted to pivotally connect another of the arms of said lever with the propelling member, and means connecting the third arm of said lever with said depth adjusting means.

15. In a plow, the combination with a beam, a furrow opener carried thereby, a ground engaging wheel, means supporting the beam on said wheel for vertical adjustment, and a lever operable to adjust said supporting means to vary the depth of plowing, of a vertically and laterally swinging draft connection for transmitting the draft of a propelling member to the beam, said connection and the beam being capable of vertical movement relatively to each other, a bell crank lever pivotally mounted on the beam and having upwardly and forwardly extending arms arranged to swing in a vertical plane, means connecting the upwardly extending arm of said bell crank lever with said depth adjusting lever, and means connecting the forwardly extending arm of said bell crank lever with said draft connection.

16. In a plow, the combination with a beam, a furrow opener carried thereby, a ground engaging wheel, means for supporting the beam on said wheel for vertical adjustment, and a lever operable to adjust said supporting means to vary the depth of plowing, of a vertically and laterally swinging draft connection for transmitting the draft of the propelling member to the beam, said connection and said beam being capable of vertical movement relatively to each other, a vertically disposed slot at the forward end portion of the beam, means carried by said draft connection and operating in said slot to transmit the draft to said beam, and rocking means mounted on the beam and connected with said lever and with said draft connection for moving said beam vertically relatively to the draft connection when said lever is actuated to vary the depth of plowing.

17. In a plow, the combination with a beam, a furrow opener carried thereby, a ground engaging wheel, means supporting the beam on said wheel for vertical adjustment, and a lever operable to adjust said supporting means to vary the depth of plowing, of a vertically and laterally swinging draft connection for transmitting the draft of a propelling member to the beam, said connection and the beam being capable of vertical movement relatively to each other, a vertically disposed slot at the forward end portion of the beam, means carried by said draft connection and operating in said slot to transmit the draft to the beam, and a bell crank lever mounted on the beam and connected with said lever and with said draft connection for moving said beam vertically relatively to the draft connection when said lever is actuated to vary the depth of plowing.

CARL G. STRANDLUND.
THEOPHILUS BROWN.